United States Patent [19]

Cang

[11] Patent Number: 5,198,899
[45] Date of Patent: Mar. 30, 1993

[54] NETWORK FOR INTERACTIVE DISTRIBUTION OF VIDEO, AUDIO AND TELEMATIC INFORMATION

[75] Inventor: Luc P. V. Cang, Savigny Sur Orge, France

[73] Assignee: Thomson Consumer Electronics, Courbevoie, France

[21] Appl. No.: 603,755

[22] Filed: Nov. 15, 1990

[30] Foreign Application Priority Data

Mar. 21, 1989 [FR] France ................... 89 03671

[51] Int. Cl.⁵ .................... H04N 7/10; H04H 1/02
[52] U.S. Cl. .................... 358/86; 455/4.2; 455/6.2
[58] Field of Search ........... 455/2, 3.1, 3.3, 4.1, 455/4.2, 5.1, 6.1, 6.2, 6.3, 67.1, 67.3; 358/84, 86

[56] References Cited

U.S. PATENT DOCUMENTS

| | | | |
|---|---|---|---|
| 4,040,045 | 8/1977 | Osborne et al. | 455/6.3 |
| 4,347,604 | 8/1982 | Saito et al. | 455/2 |
| 4,365,249 | 12/1982 | Tobata | 455/2 |
| 4,538,174 | 8/1985 | Gargini et al. | 455/4 |
| 4,894,825 | 1/1990 | Kobayashi et al. | 455/6.2 |

Primary Examiner—Reinhard J. Eisenzopf
Assistant Examiner—Lisa D. Charouel
Attorney, Agent, or Firm—Oblon, Spivak, McClelland, Maier & Neustadt

[57] ABSTRACT

The network of the inventnion, of the type with star cabling, comprises a distribution center to which are connected by cable subscribers each having a remote control unit. The center comprises a video bus connected to the various program sources, this bus being connected to selection modules (M1 to MN) the number of which is equal to that of the subscribers and which are remotely controlled by these subscribers. A microcomputer monitors the legality of the connections established.

10 Claims, 5 Drawing Sheets

NETWORK FOR INTERACTIVE DISTRIBUTION OF VIDEO, AUDIO AND TELEMATIC INFORMATION

BACKGROUND OF THE INVENTION

1. Field of the Invention

The present invention relates to a network for interactive distribution of video, audio and telematic information.

2. Discussion of the Related Art

The cable-distribution of video signals to a group of subscribers localized in a confined area, for example a building, may be performed from a distribution center from which cables go out to each subscriber, and are intended to carry a programme chosen from a group which the distribution center makes available. The subscriber selects a programme by virtue of a means of access to a switching device, commonly referred to as the "switching grid" and situated in the distribution center. This switching device enables a connection to be established between the individual cable of the subscriber and the source of the programme chosen. In order to send control signals to the switching device, this means of access may use the cable serving to transmit the programmes to the subscriber. A known network of this type enables connections to be established between M sources of information to be distributed and a group of N users wishing to receive on request one of the programmes from the sources arriving at the distribution center. The advantage of such a network, which has to transmit one programme only at a time, is to enable the use of low-cost cables which are easy to lay and which are given the job of transmitting over a moderate distance a signal whose frequency standard stays within a restricted pass band. The management of the individual connections of this network with star cabling may be ensured with the aid of logic means of control using a microprocessor.

It is known to sequentially process the selection requests formulated by the subscribers of the network by sending them over a bus intended for this use where these requests are associated with the address of the requester. These requests are processed one after the other which enables verification of the legality of the requests and organization of the pricing.

The disadvantage of microprocessor management of the selection requests is to introduce a delay into the satisfaction of the requests and to multiplication means which could be common to a large number of users. A lack of flexibility in adapting to more or less important needs, delicate to solve connection problems, and a more difficult to ensure reliability result therefrom.

SUMMARY OF THE INVENTION

The subject of the present invention is a network of the type with star cabling which enables rapid satisfaction of the requests from the subscribers, which is simple to construct and the least expensive possible.

The network according to the present invention comprises, in the distribution center a video bus connected to information sources, and for each subscriber a switching module remotely controlled by the subscriber in order to establish, without other means, a connection to one of the information sources, the various switching modules being connected to a processor for managing the centre.

Advantageously, the processor periodically monitors the conformity of the current connections. When the processor recognizes an unauthorized switching, it authoritatively changes it by acting on the module called into question. According to one embodiment, a switching module comprises a multiplexer connected, on one side, to the video bus and, on the other side, via a corrector-preamplifier and a power amplifier, to the cable for connection to the subscriber, this connection cable furthermore being connected, in the distribution center, to a remote control detector-decoder circuit via a filter, this detector circuit being connected to the control input of the multiplexer and to the processor for managing the center.

BRIEF DESCRIPTION OF THE DRAWINGS

The present invention will be better understood on reading the detailed description of an embodiment, taken as a non-limiting example and illustrated by the attached drawing in which.

DETAILED DESCRIPTION OF THE PREFERRED EMBODIMENTS

Figure 1:
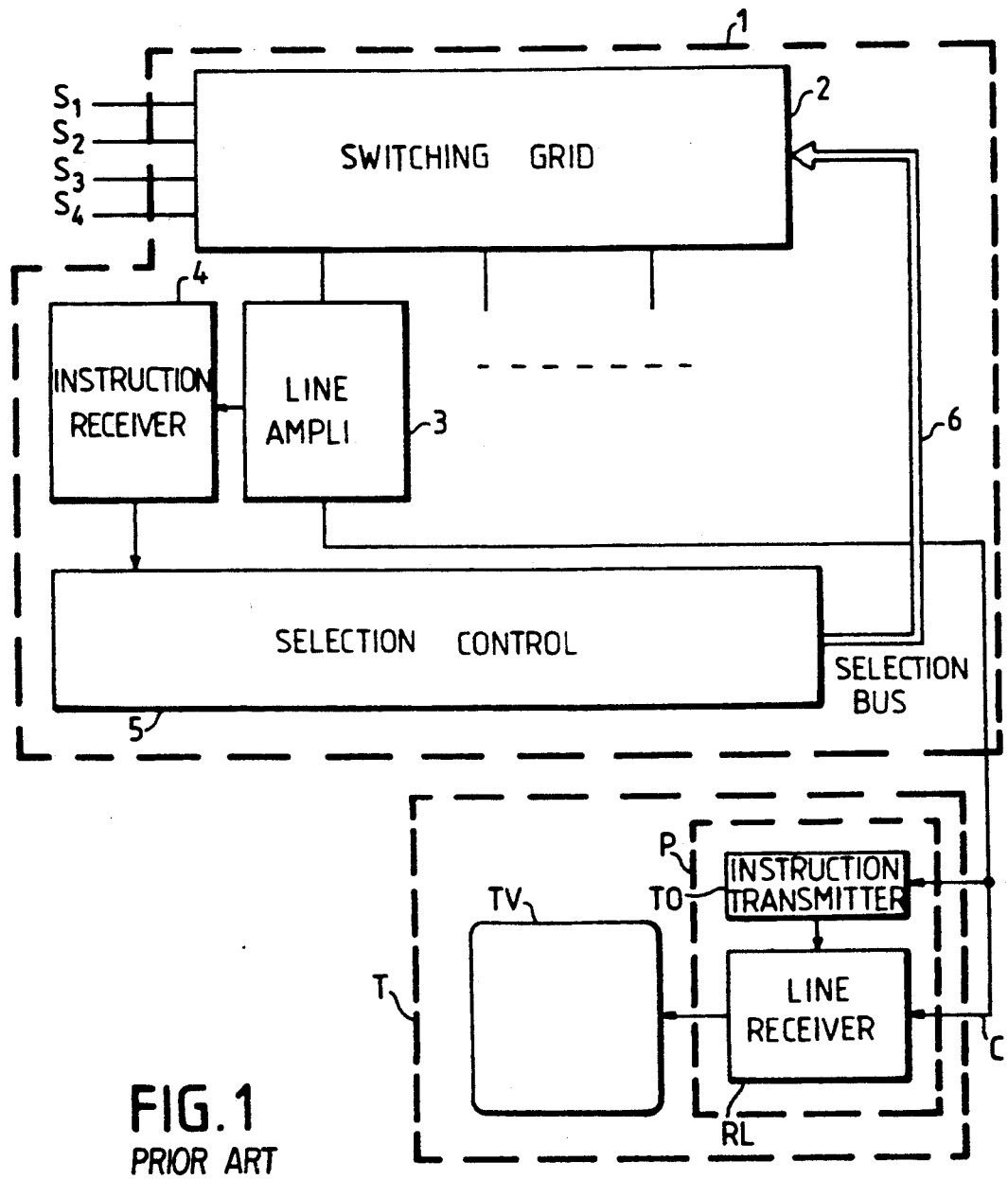
FIG. 1 is a partial block diagram of a remote distribution network of the prior art.

The remote distribution network represented in a simplified way in FIG. 1 comprises essentially a distribution center 1 receiving, for example via a cable or from a receiver of emissions transmitted by satellite, M programme sources (four in FIG. 1, referenced S1 to S4) in order to retransmit them on request to subscribers belonging to a group of N subscribers connected to this center.

The distribution center 1 is connected to each of the N subscriber terminals by an individual connection cable C, thus forming a network with star cabling. One of these terminals, referenced T, has been represented in FIG. 1. The terminal T comprises essentially, a subscriber unit P comprising a line receiver RL and an instruction transmitter TO, and it is connected to a user set, in the present case a television TV.

The distribution center 1 comprises a switching grid 2 with M inputs and N outputs corresponding to the N subscribers of the center 1. The cable C is connected, in the center 1, to a line amplifier 3 itself connected to one of the N outputs of the grid 2 and to an instruction receiver 4. The instruction receiver 4 is connected to a device 5 for selection control comprising a microprocessor and controlling the grid 2 via a selection bus 6.

Figure 2:
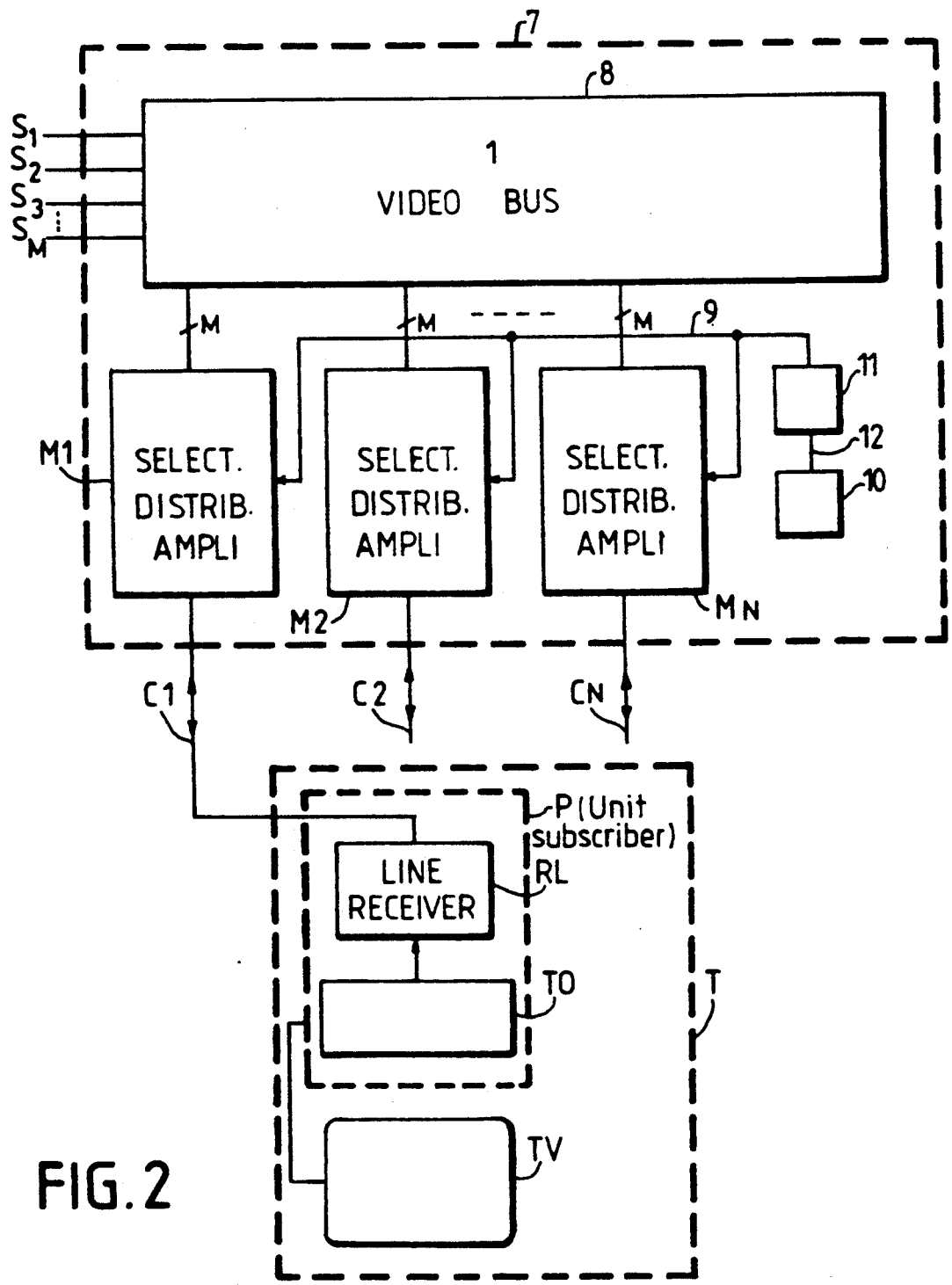
FIG. 2 is a partial block diagram of a remote distribution network according to the invention.

The remote distribution network of the invention, represented partially in FIG. 2, uses a modular architecture at the level of the distribution center 7. This center 7 comprises a bus 8 connected to M programme sources (S1 to SM). In what follows, this bus will be referred to as the video bus, but it is of course understood that the sources to which it is connected may just as well be video as telematic, audio or other sources. The bus 8 is connected to N selection modules M1 to MN each of these N modules being connected by a connection cable C1 to CN respectively to one of the N subscriber terminals served by the center 7. It is of course understood that the center 7 may comprise a greater number of modules than the number of subscribers with a view to the subsequent attachment of other subscribers. One terminal T, similar to that of FIG. 1, has been represented in FIG. 2. The N modules are moreover connected to a local control bus 9 itself connected to a microcomputer 10 via an interface 11 and a processing bus 12. Each of these modules is itself capable of satisfying a request for connection to a programme source, remotely formulated by the corresponding subscriber.

Figure 3:
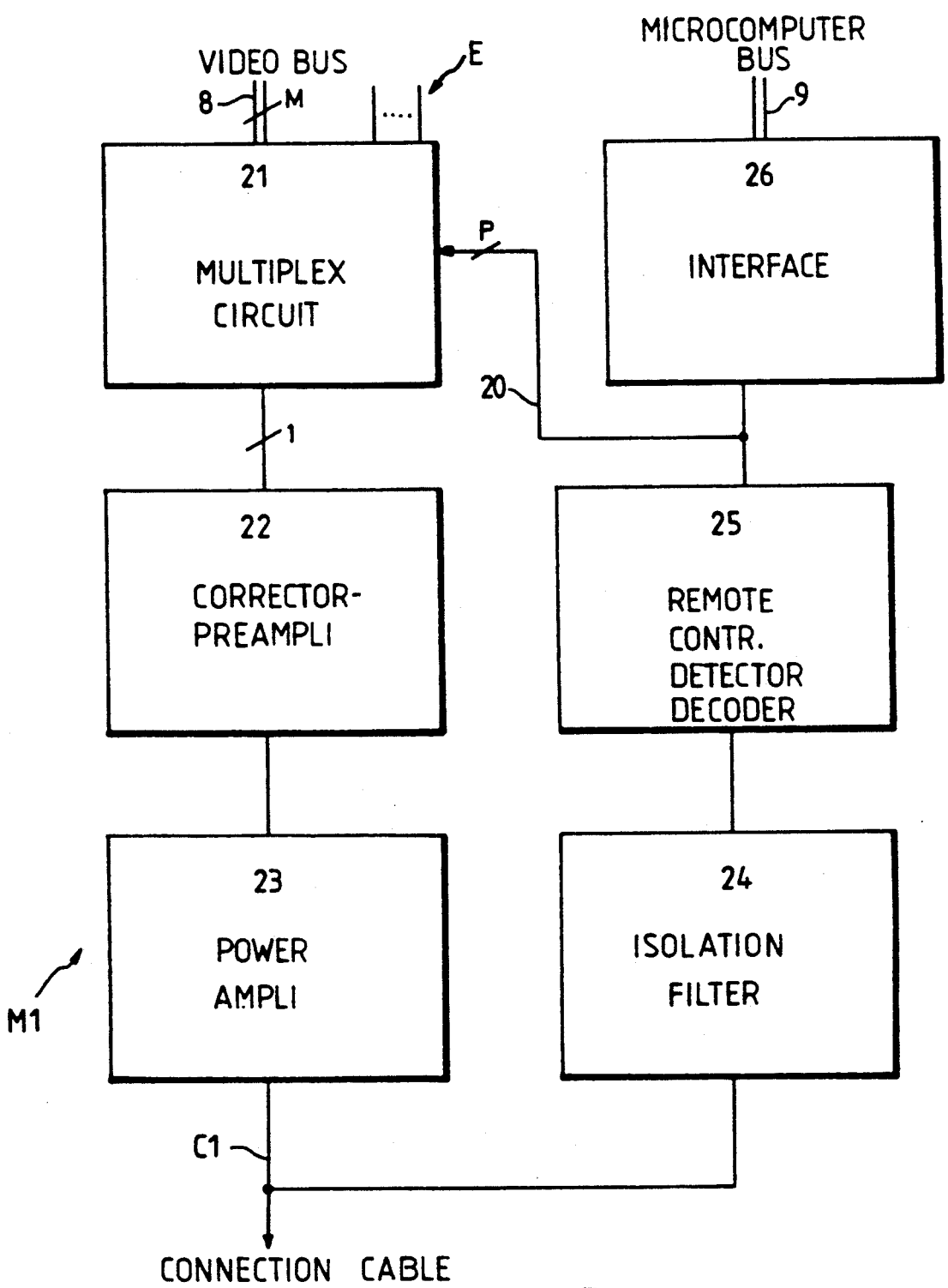
FIG. 3 is a block diagram of a switching module of the network of FIG. 2.

The block diagram of one of the N selection modules, for example the module M1, has been represented in FIG. 3. This module M1 comprises a multiplexer 21 with M inputs and one output. The M inputs of the multiplexer 21 are respectively connected to the M conductors of the video bus 8, and its output is connected via a corrector-preamplifier 22 to a power amplifier 23 leading into the connection cable C1. As a variant, the multiplexer 21 may comprise one or more other inputs E not connected to the bus 8 but to other optional devices (special sources, test sets, etc).

In the module M1, the cable C1 is furthermore connected via an isolation filter 24 to a remote control decoder and detector circuit 25. The output of the circuit 25 is connected to the control input of the multiplexer 21 by a bus 20 with P conductors. This bus 20 is furthermore connected via an interface 26 to the microcomputer bus 9.

At the output of the multiplexer 21 is available the programme broadcast by that one of the M sources which is selected by its control input with P leads. In the present example this programme consists of a video signal which must be pre-accentuated in order to compensate the (frequency-dependent) amplitude distortions introduced by the transmission over the connection cable (C1). When the cable used is a cable comprising a pair of conductors for telephone or telematic use, untimely radiation from this line, as well as the perturbations due to external electric fields can be avoided by a symmetric excitation of the conductors of the pair in question. These two functions of pre-accentuation and excitation of the connection cable are ensured by the corrector-preamplifier 22 and the line amplifier 23, this latter being symmetric or asymmetric according to the type of cable used (bifilar or coaxial cable).

On the subscriber's side, the connection cable is connected up, in the line receiver RL, to a matcher-compensator circuit (not represented in detail) which, for reasons of protection against perturbations, has symmetric inputs if the connection cable is bifilar. This matcher-compensator circuit may, like the preamplifier 22, participate in the correction of the distortions of the signal arising during its routing in the connection cable. This involves post-corrections.

The filter 24 isolates the remote control signals, produced by the subscriber and carried by the connection cable, from all the other signals passing through the connection cable. These remote control signals are transported by a high frequency sub-carrier situated for example above the range of frequencies occupied by a video signal in baseband mode and by an associated sound sub-carrier. The circuit 25 detects these remote control signals and decodes them in order to supply the bus 20 with the address of the source requested by the subscriber, this address controlling, in the multiplexer 21, the selection of this source.

By virtue of the elements 21 to 25 of the distribution center and by virtue of the unit P, the selection request from the subscriber is satisfied once it is formulated. However, to manage the network, in particular to monitor the programme selections thus effected, and, if necessary, to counter certain connections unauthorized by the service offered to the subscriber, or to determine the connection times with a view to compiling a bill, there is moreover provided in the distribution center a microcomputer 10 which is not however necessary for establishing the connections with the sources. In each module M1 to MN the interface 26 ensures the connection with this microcomputer. This interface enables transmission to the microcomputer of the address of the source requested and that of the module in question (or of the subscriber) which are necessary for the various management operations. The interface 26 furthermore ensures the connection in the other sense for authoritatively changing the addressing of the multiplexer 21 when the source designated by the subscriber does not belong to the sources to which he has the right to become connected according to the terms of the contract which he has signed. Certain programmes may be for restricted broadcast, which represents a first differentiation criterion which a management microcomputer will have to uphold. Another differentiation criterion results from the fact that the programmes may be free or paid for depending on the conditions agreed between the subscriber and the distributing company. The management by microcomputer 10 also enables the drawing up of listening statistics and control of the broadcasting over the network of information about the services offered.

To describe in more concrete fashion the network according to the invention, reference will be made to an example of a star network serving 2048 subscribers. The distribution center must then comprise 2048 modules such as the module M1 of FIG. 3. These modules may be distributed in electronic racks each comprising 256 modules laid out four by four on 64 plug-in boards on a backplane where the cables for connecting the subscribers, the video bus and the microcomputer bus 20 finish up.

In a manner well-known per se and not described in detail here the microcomputer 10 comprises a microprocessor, random-access memory, read-only memory, input/output circuits and other appropriate logic circuits.

In the example considered, it may be assumed that in the array for addressing the microprocessor a block of 16 addresses has been reserved, with input and output ports for the management of the interactive distribution network. It may furthermore be assumed that the even addresses of the block correspond to an exchange of data representing the address of a subscriber in the rack wherein is situated the module which is allocated thereto. The odd addresses of the block correspond to an exchange of data representing the number of the information source. If each datum is expressed through one byte, it is seen that with 16 bits sharing an even address and the odd address which follows, there may be designated in one rack a subscriber and the source number to which he is linked during a reading of the states of connection of this rack, or to which he is returned during a writing phase imposing a change of connection in the rack.

Figure 4:
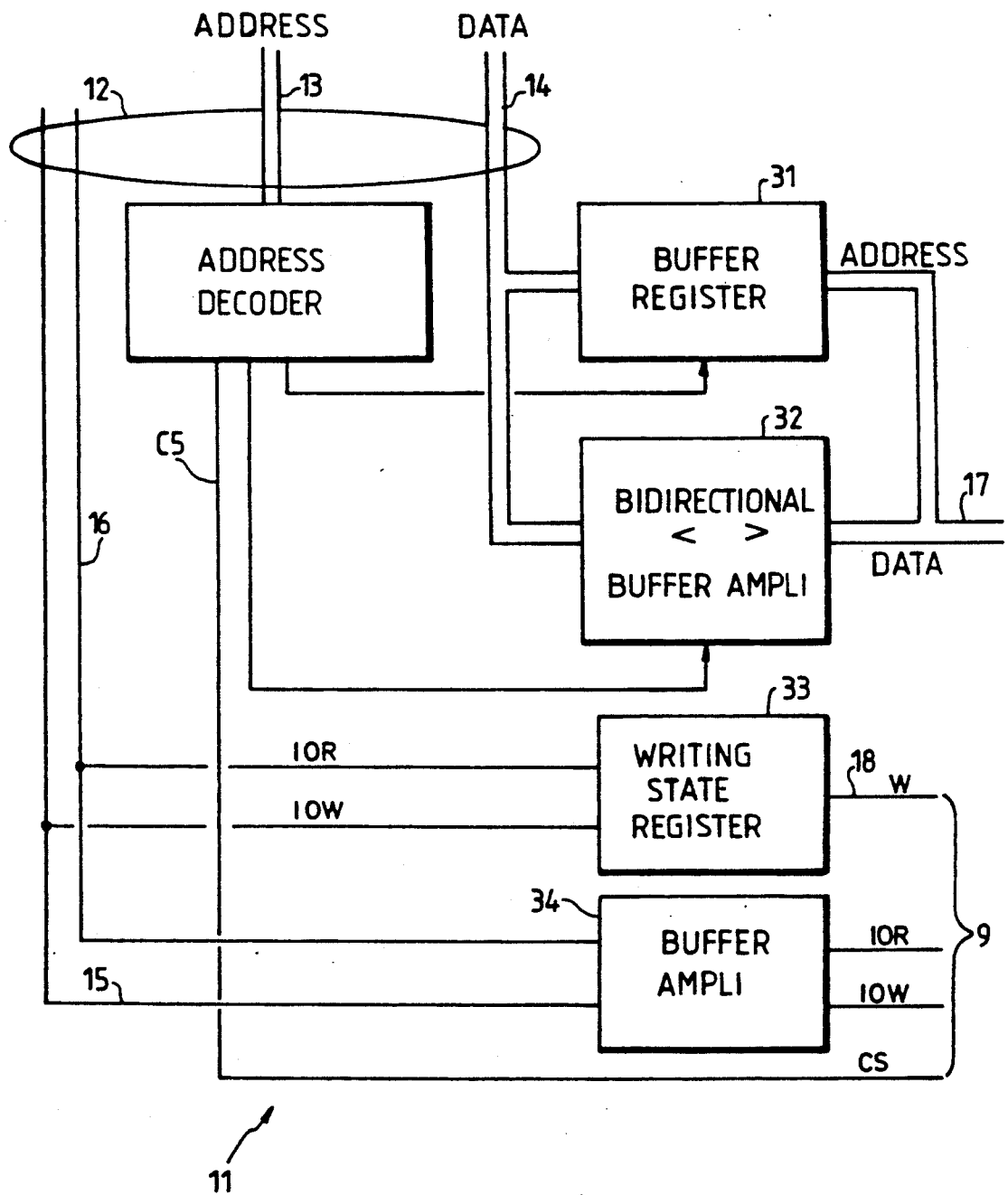
FIG. 4 is a block diagram of the microcomputer bus interface of the module of FIG. 3.

The detailed block diagram of the interface 11 connecting the processing bus 12 to the local bus 9 has been represented in FIG. 4. The bus 12 comprises essentially address leads 13, data leads 14, a lead 15 (IOW) and a lead 16 (IOR) respectively for writing and reading of input-output ports. The bus 9 comprises essentially address and data leads 17, a lead 18 for controlling writing (W) and leads IOR, IOW and CS. The address leads 13 are connected to an address decoder 30 which supplies an item of chip selection information CS to the bus 9 and which monitors the storing of the data in a buffer register 31 and a bidirectional buffer amplifier 32. These data are subscriber numbers transmitted by the bus 12 and source numbers which are read or written by the microcomputer and which pass through the buffer amplifier 32. The signals IOR and IOW indicating reading and writing into the input/output ports control a state register 33 which opens and closes a writing cycle, by virtue of a datum transmitted by the line W of the bus 9. A buffer amplifier 34 places the lines IOR and IOW of the buses 9 and 12 into correspondence.

Figure 5:
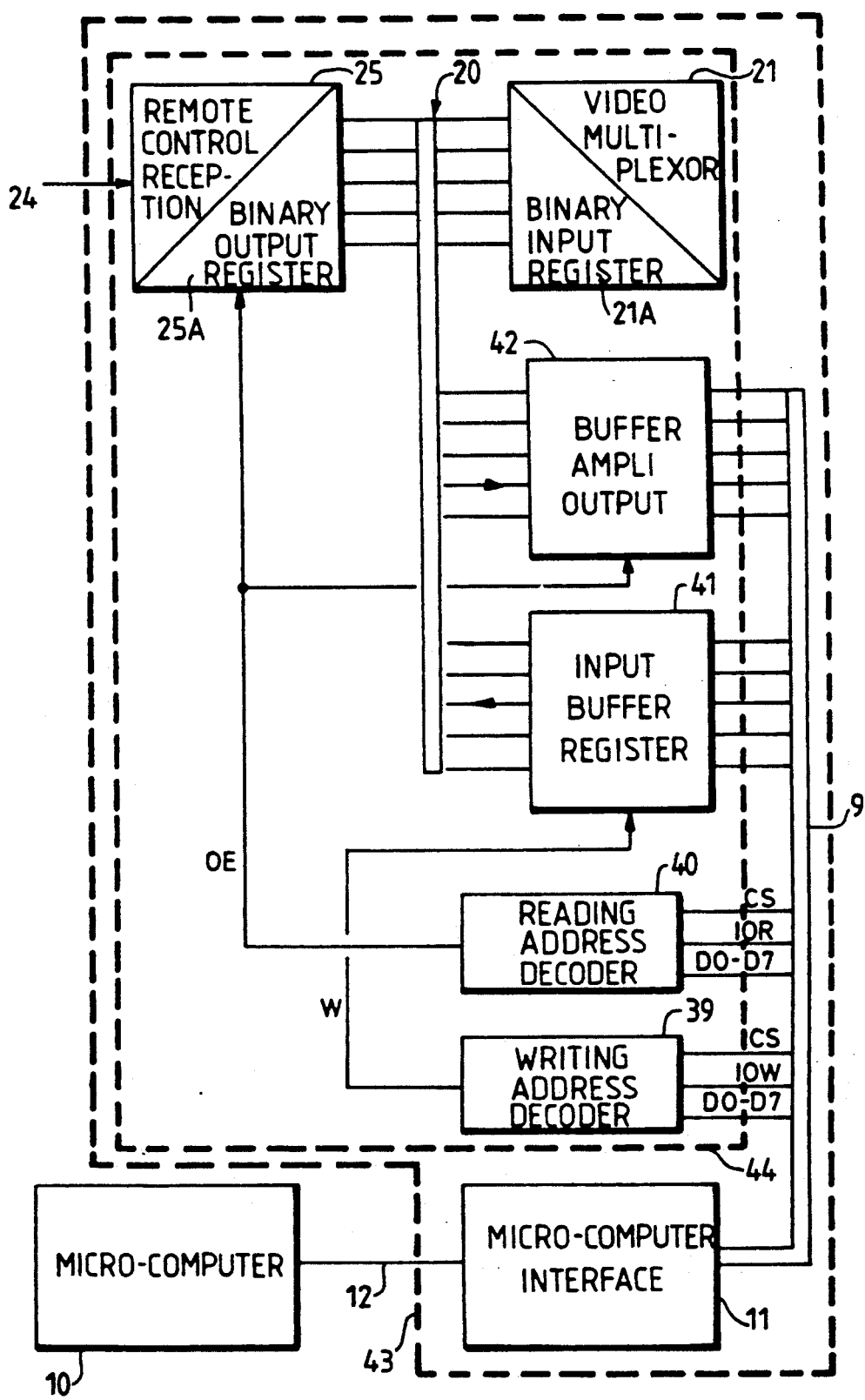
FIG. 5 is a block diagram of one part of the module of FIG. 3 showing its circuits for connection to the local control bus.

In FIG. 5 has been represented the detailed block diagram of an embodiment of part (essentially the digital part) of a module such as the module M1, with its connection to the bus 9 and the elements 10 to 12. In the present example this bus 9 may serve 256 subscribers.

The circuit 25 comprises a three-state binary output register 25A connected to the bus 20, this register having a validation input connected to a lead OE itself connected to the output of a reading address decoder 40. This lead OE is furthermore connected to the control input of an output buffer register 42 joined up between the buses 9 and 20. The multiplexer 21 comprises a binary input register 21A connected to the bus 20. A writing address decoder 39 is connected to the bus 9. Its output W is connected to the control input of an input buffer register 41 joined up between the buses 9 and 20.

When a subscriber effects the choice of a source by sending a remote control signal via his connection cable, a binary number representing the number of this source is delivered to the bus 20 by the register 25A of the circuit 25 and transferred into the register 21A of the multiplexer 21 by an appropriate validation pulse. There results therefrom the connection of the subscriber to the source which he has chosen without intervention of the microcomputer 10.

The reading by the microcomputer 10 of the source-subscriber connections is done during a cycle in the course of which: the microcomputer selects, by means of the signal CS, the rack in which the corresponding selection module is located, sends on the bus 12 the number of the subscriber to be monitored, and initializes the reading cycle by activating the line IOR. The reading address decoder 40 which recognizes this subscriber number activates the corresponding buffer amplifier 42 which transmits to the bus 9 the number, available on the bus 20, of the source which the subscriber in question is receiving. With this source number and the number of the subscriber, a table for access to the sources can be created in the memory array of the microcomputer. A sequential reading cycle enables all the subscriber number-source number pairs to be placed in random-access memory. For about one hundred subscribers, this loading lasts a few milliseconds and hence the reading cycles may be repeated at intervals such that it is possible to bill the connect time to within a minute.

The access table thus created may reveal the fact that certain subscribers are wrongly receiving a programme. Comparison tests are effected to draw up a table of the changes to be imposed on the connections called for and provisionally obtained by the subscribers. The microcomputer then sets off a writing cycle to impose these changes. To this end, a subscriber number and an information source number are placed on the bus 12 while the line IOW is activated.

The effect of this is to set the outputs of the register 25A at the high impedance state and to deactivate the buffer amplifier 42. The writing address decoder 39 activates the input buffer register 41 which places on the bus 20 the P binary data which express the number of the source imposed by the microcomputer in the course of the writing cycle. The taking into account of these data by the multiplexer 21 is controlled by an appropriate clock pulse which ends the writing phase. The writing cycle may relate to a single connection correction, but it is simpler to provide a sequence of several corrections relating to several subscribers in the course of one and the same writing cycle.

In the preceding description, it is seen that the connections are effected on the initiative of the subscribers by virtue of the means contained in the respective modules which are allocated to them. The microcomputer serves to sample the modules to put together a state of the current connections. The microcomputer then serves to authoritatively connect up the subscribers who are illegally connected to an unauthorized source to a shadow source without video or to a messaging source which may be fed through the microcomputer or through any other means. Thus, the subscriber to whom a brief delay is accorded for consulting the programme to which he has illegally connected, is diverted from the latter and joined up to a messaging system which may invite him to sign a contract widening his connection options.

Once the subscriber no longer wishes to receive programmes coming from the distribution center, and wishes to go over to receiving a programme broadcast by electromagnetic waves, it is advantageous that he only be able to do so by requesting the distribution center for a connection to a shadow channel, as is described in the patent application filed by the Applicant on the same day as the present application and entitled "Device for detecting termination of connection to a programme to be paid for received by a subscriber unit via an interactive remote distribution network".

Through its modular organization enabling the connection of a subscriber without going through a microcomputer, good reliability and an immediate reaction to the request from the subscriber are obtained. The breakdown of the microcomputer does not prevent the broadcasting of the programmes to the subscribers, but may merely prevent the supervision of the current connections and cause the diversions necessary to prevent a subscriber from illegally receiving a programme. The modular organization of the distribution center promotes the flexibility of installation and of extension of the interactive distribution network.

I claim:

1. Network for interactive distribution of video, audio and telematic information, with star cabling from a distribution center, including a plurality of subscribers dependent on the distribution center having remote control devices enabling the subscribers to choose one of a plurality cf programmes offered by the distribution center, characterized in that the network comprises, in the distribution center, a video bus connected to a plurality of information sources of which a subscriber may or may not be entitled to be connected to, and for each of said plurality of subscribers there is provided a switching module remotely controlled by the subscriber in order to establish a connection to one of said information sources, the switching module being connected to a processor for managing the distribution center, such that if the information source is one to which the subscriber is not entitled to be connected, an output of a detector-decoder circuit is set in a high impedance state by the processor in order to end connection to the information source and then connect the subscriber to a shadow source without video images or a messaging source transmitted through the processor.

2. Network according to claim 1, characterized in that the processor periodically monitors the connection in order to determine if the subscriber is connected to an information source to which the subscriber is entitled to be connected.

3. Network according to claim 1, characterized in that remote control instructions emitted by the subscriber pass through a connection cable for transmitting the programmes from the distribution center to the subscriber.

4. Network according to claim 3, characterized in that the switching module comprises a multiplexer connected, on one side, to the video bus and, on the other side, via a corrector-preamplifier and a power amplifier, to the connection cable for connection to the subscriber, the connection cable furthermore being connected, in the distribution center, to the remote control detector-decoder circuit via a filter, wherein the detector-decoder circuit is connected to a control input of the multiplexer and also to the processor in order to manage the distribution center.

5. Network according to claim 4, characterized in that the multiplexer comprises at least one additional input for connection to an element within the distribution center other than the video bus.

6. Network according to claim 3, characterized in that each of said plurality of subscribers has a terminal, connected to the distribution center by the connection cable, said terminal comprising means for remote control emission of said remote control instructions and means for linking a receiver which receives signals corresponding to a selected programme.

7. Network according to claim 6, characterized in that the programme selected is transmitted in a baseband mode and the remote control emission of said remote control instructions is carried out by a carrier wave.

8. Network according to claim 3, characterized in that said connection cable is connected to a means for compensating for amplitude/frequency distortions due to spreading of signals corresponding to the selected programme across the connection cable.

9. Network according to claim 3, characterized in that said connection cable comprises at least one bifilar line.

10. Network according to claim 9, characterized in that the line is connected to a means for attenuating radiation generated in the line and reducing perturbations caused by external electric fields.

* * * * *

UNITED STATES PATENT AND TRADEMARK OFFICE
CERTIFICATE OF CORRECTION

PATENT NO. : 5,198,899
DATED : March 30, 1993
INVENTOR(S) : Luc PHAM VAN CANG It is certified that error appears in the above-identified patent and that said Letters Patent is hereby corrected as shown below:

On the title page, Item [19], [75], [22], [86] and [87],

[19] The inventor's last name, should read:  --PHAM VAN CANG--

[75] The inventor's name is incorrect, should read: --Luc PHAM VAN CANG--

The PCT Information has been omitted, should read:

--[22]  PCT Filed:        Mar. 16, 1990

[86]  PCT No.:          PCT/FR90/00177

§ 371 Date:       Nov. 15, 1990

§ 102(e) Date:    Nov. 15, 1990

[87]  PCT Pub. No.:     WO 90/11664

PCT Pub. Date:    Oct. 4, 1990 --

Signed and Sealed this

Seventh Day of December, 1993

*Attest:*

BRUCE LEHMAN

*Attesting Officer*     *Commissioner of Patents and Trademarks*